(12) United States Patent
Blum

(10) Patent No.: US 12,273,262 B1
(45) Date of Patent: *Apr. 8, 2025

(54) METHOD AND SYSTEM FOR DETECTING LATENCY IN A WIDE AREA NETWORK

(71) Applicant: PubNub, Inc., San Francisco, CA (US)

(72) Inventor: Stephen L. Blum, San Francisco, CA (US)

(73) Assignee: PubNub, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,850

(22) Filed: Dec. 21, 2023

Related U.S. Application Data

(63) Continuation of application No. 17/455,942, filed on Nov. 22, 2021, now Pat. No. 11,888,728, which is a continuation of application No. 15/931,693, filed on May 14, 2020, now Pat. No. 11,184,266.

(51) Int. Cl.
| | |
|---|---|
| *H04L 45/00* | (2022.01) |
| *H04L 43/0864* | (2022.01) |
| *H04L 43/16* | (2022.01) |
| *H04L 45/12* | (2022.01) |

(52) U.S. Cl.
CPC .......... *H04L 45/22* (2013.01); *H04L 43/0864* (2013.01); *H04L 43/16* (2013.01); *H04L 45/123* (2013.01)

(58) Field of Classification Search
CPC ..... H04L 45/22; H04L 43/0864; H04L 43/16; H04L 45/123
See application file for complete search history.

(56) References Cited

U.S. PATENT DOCUMENTS

| | | | |
|---|---|---|---|
| 8,489,722 | B2 | 7/2013 | Karenos et al. |
| 8,589,495 | B1 | 11/2013 | Beckert |
| 8,661,118 | B2 | 2/2014 | Fagg et al. |
| 8,737,243 | B2 | 5/2014 | Scobbie |
| 8,918,497 | B2 | 12/2014 | Nassar et al. |
| 9,252,915 | B1 | 2/2016 | Bakken |
| 9,608,928 | B1 | 3/2017 | Walkin |
| 9,806,961 | B2 | 10/2017 | Anakkot et al. |
| 9,965,640 | B1 | 5/2018 | Blum et al. |
| 10,277,653 | B2 | 4/2019 | Narayanan et al. |
| 10,447,597 | B1 | 10/2019 | Kim et al. |
| 10,511,491 | B2 | 12/2019 | Kanojia et al. |
| 10,542,077 | B1 | 1/2020 | Balakrishnan et al. |
| 10,742,532 | B2 | 8/2020 | Tang et al. |
| 10,911,391 | B2 | 2/2021 | Hara et al. |
| 2016/0173593 | A1* | 6/2016 | Kesavan ............ H04L 67/1095 709/204 |
| 2018/0146058 | A1* | 5/2018 | Somayazulu ....... H04L 67/1097 |

* cited by examiner

*Primary Examiner* — Patrice L Winder
(74) *Attorney, Agent, or Firm* — Fox Rothschild LLP

(57) ABSTRACT

A method of detecting latency in message delivery in a communication network is disclosed. One or more data centers receives messages that are to be published via the communication network. The system receives queries from subscribers, processes the queries and transmits messages to the subscribers in response to the queries. The subscribers acknowledge the messages. The system uses its own processing time and the acknowledgement time to assess latency in message delivery. The system also may use the information to determine which data center or geographic location is experiencing relatively higher latency than other data centers or locations.

20 Claims, 7 Drawing Sheets

| Query Request | IP address of Subscriber 121 | pnsdk | $time_n$ | $req\_t_i$ |
|---|---|---|---|---|
| 1 | 6969178741 | 51.36.231.116 | PubNub-JS-Web/3.7.1 | 1495208535 | 279.6929931640625 |
| 2 | 6969178741 | 51.36.231.116 | PubNub-JS-Web/3.7.1 | 1495208255 | 278.4930114746094 |
| 3 | 6969178741 | 51.36.231.116 | PubNub-JS-Web/3.7.1 | 1495209096 | 280.0039978027344 |
| 4 | 6969178741 | 51.36.231.116 | PubNub-JS-Web/3.7.1 | 1495207692 | 280.0029907226562 |
| 5 | 6969178741 | 51.36.231.116 | PubNub-JS-Web/3.7.1 | 1495207126 | 280.0050048828125 |
| 6 | 6969178741 | 51.36.231.116 | PubNub-JS-Web/3.7.1 | 1495206846 | 178.5630035400390 |
| 7 | 6969178741 | 51.36.231.116 | PubNub-JS-Web/3.7.1 | 1495207975 | 280.0169982910156 |
| 8 | 6969178741 | 51.36.231.116 | PubNub-JS-Web/3.7.1 | 1495208816 | 280.0039978027344 |
| 9 | 6969178741 | 51.36.231.116 | PubNub-JS-Web/3.7.1 | 1495209377 | 278.8049926757812 |
| 10 | 6969178741 | 51.36.231.116 | PubNub-JS-Web/3.7.1 | 1495207409 | 280.0029907226562 |

| | connection_id | client_ip_address | pubnub_resources_time_sec | datacenter | total_wan_time_sec | average_wan_latency_per_api_call_sec | samples |
|---|---|---|---|---|---|---|---|
| 1 | 20938422555 | 68.4.29.146 | 40.235 | us-west-1 | 31.765 | 3.1765 | 11 |
| 2 | 198277894614 | 104.50.0.113 | 51.934 | us-west-1 | 24.066 | 3.00825 | 9 |
| 3 | 350880080185 | 66.86.152.165 | 47.254 | us-east-1 | 23.746 | 1.583068667 | 16 |
| 4 | 156276710977 | 99.176.15.87 | 48.703 | us-east-1 | 21.297 | 3.042428571 | 8 |
| 5 | 359683591768 | 73.165.53.13 | 52.476 | us-east-1 | 16.522 | 2.06525 | 9 |
| 6 | 197615053326 | 67.173.255.18 | 45.493 | us-west-1 | 16.507 | 2.751166667 | 7 |
| 7 | 156283040682 | 184.53.16.212 | 55.653 | us-east-1 | 16.347 | 1.167642857 | 15 |
| 8 | 197822368638 | 67.173.255.18 | 46.437 | us-west-1 | 15.563 | 2.593833333 | 7 |
| 9 | 198203683263 | 71.231.123.116 | 55.16 | us-west-1 | 14.84 | 1.648888889 | 10 |

FIG. 4C

| | connection_id | client_ip_address | pubnub_resources_time_sec | datacenter | total_wan_wait_sec | average_wan_wait_per_api_call_sec | samples |
|---|---|---|---|---|---|---|---|
| 1 | 209338234236 | 136.36.39.98 | 32.996 | us-west-1 | 1.004 | 0.1255 | 8 |
| 2 | 322921624453 | 98.70.111.217 | 68.995 | us-east-1 | 1.005 | 0.1116666667 | 10 |
| 3 | 359978534190 | 107.11.254.231 | 68.991 | us-east-1 | 1.009 | 0.126125 | 9 |
| 4 | 350868358182 | 88.195.41.187 | 68.99 | us-east-1 | 1.01 | 0.09181818182 | 12 |
| 5 | 320794418275 | 67.88.84.194 | 1.99 | us-east-1 | 1.01 | 0.505 | 3 |
| 6 | 350864486949 | 108.49.220.166 | 68.986 | us-east-1 | 1.014 | 0.1126666667 | 10 |
| 7 | 197036484464 | 162.227.80.156 | 58.985 | us-west-1 | 1.015 | 0.145 | 8 |
| 8 | 156398920382 | 99.55.165.240 | 48.984 | us-west-1 | 1.016 | 0.2032 | 6 |
| 9 | 321778521297 | 209.180.18.50 | 68.982 | us-east-1 | 1.018 | 0.1131111111 | 10 |
| 10 | 322207515782 | 99.190.194.136 | 58.981 | us-west-1 | 1.019 | 0.127375 | 9 |
| 11 | 350879984232 | 24.107.129.217 | 68.98 | us-east-1 | 1.02 | 0.1457142857 | 8 |
| 12 | 321456071513 | 24.107.15.241 | 32.98 | us-east-1 | 1.02 | 0.34 | 4 |
| 13 | 350895931592 | 88.233.117.209 | 49.978 | us-east-1 | 1.022 | 0.511 | 3 |

METHOD AND SYSTEM FOR DETECTING LATENCY IN A WIDE AREA NETWORK

RELATED APPLICATIONS AND CLAIM OF PRIORITY

This patent document claims priority to and is a continuation of U.S. patent application Ser. No. 17/455,942, filed Nov. 22, 2021, which is a continuation-in-part of U.S. patent application Ser. No. 15/931,693 (U.S. Pat. No. 11,184,266), filed May 14, 2020. The disclosures of each priority application are fully incorporated into this document by reference.

BACKGROUND

Data traversing a network is vulnerable to manipulation in a variety of ways. For example, attackers may decrypt and exploit the data, via cyber-attacks and network traffic sniffing. In another example, governments and/or Internet Service Providers may throttle the bandwidth of a network, thereby reducing the speed at which the data traverses the Internet.

Publishers that use wide area networks to transmit messages, stream media, or otherwise deliver information to subscribers can be adversely affected when interference with a network causes the delivery of messages to be delayed. Current systems for detecting latency require the installation of agents, typically at both endpoints of a data transmission. This requires cost and complexity, and it is limited to identifying issues with singular transactions. It is not ideal for identifying and predicting network issues until after they appear.

This document describes methods and systems that are directed to solving at least some of the issues described above.

SUMMARY

The present disclosure relates generally to distributing data over a network, and more particularly, to monitoring connectivity and detecting traffic patterns over the network.

In one or more cases, the disclosed technology relates to a method of detecting latency in a communication network by which a system of one or more data centers receives messages that are to be published via the communication network, receives queries from one or more subscriber electronic devices, and processes each query. To process each query, the system may validate a subscriber credential received from the subscriber, and it may use the subscriber credential to determine whether the data center holds one or more messages that are responsive to the query. In response to the query, the system may transmit one or more messages to the subscriber via the communication network. For each query, the system also will determine a processing time (req_ti) that the system took to respond to the query. The system will receive, from one or more of the subscriber electronic devices, an acknowledgement of receipt of a transmitted message. For each received acknowledgement, the system will determine a total time, $time_n$, representing a time from when the subscriber received an associated query to a time at which the data center received the acknowledgement. The system will then use the determined processing times and the determined total times to assess latency of the communication network for the subscriber for a time during which the system processed the queries and received the acknowledgements.

In some embodiments, when the system determines that the latency exceeds a threshold, it may select an alternate route for transmission of future messages to the subscriber. For example, in some systems in which the messages are replicated to multiple geographically distributed data centers, then when selecting the alternate route the system may, select, from the geographically distributed data centers, an alternate data center to transmit the future messages to the subscriber. The alternate data center may be that which is most proximate to the subscriber, unless it was the first data center (i.e., the one that transmitted the messages that experienced latency), in which case the system may select a next most proximate data center to the subscriber as the alternate data center.

In some embodiments, the system may present the alternate data center to the first subscriber via the electronic device so that the subscriber can accept or reject it. In response to receiving an indication of acceptance from the subscriber via the electronic device, the system may use the alternate data center to transmit one or more future messages to the first subscriber.

In some embodiments, in response to a plurality of queries from a plurality of additional subscribers, the system may transmit an additional one or more of the messages to each additional subscriber from the first data center via the communication network. For each query from each additional subscriber, the system may determine a processing time ($req\_t_i$) that the system took to respond to the query from the additional subscriber, and the system may determine a total time ($time_n$) representing a time from when the system received the query from the additional subscriber to a time at which the first data center received an acknowledgement from the additional subscriber. The system may assess an aggregated latency of the communication network as a function of the determined processing times ($req\_t_i$) and the determined total times ($time_n$) for the queries from the additional subscribers. The system may compare the aggregated latency of the communication network with the assessed latency of the communication network for the first subscriber. When the system includes various geographically distributed data centers, then upon detecting that the assessed latency of the communication network for the first subscriber exceeds the aggregated latency of the communication network by a threshold, the system may select, from the geographically distributed data centers, an alternate data center to transmit the future messages to the first subscriber.

In some embodiments, prior to receiving the queries from the electronic device of the subscriber, the system may establish a TCP connection between the system and the electronic device of the subscriber. When transmitting the one or more messages that are responsive to the query to the subscriber, the system may do so via the TCP connection. If, the system has determined that latency exceeds a threshold, the system may then close the TCP connection and establish a new TCP connection between the system and the electronic device of the subscriber.

In some embodiments, the system may receive additional queries from electronic devices of additional subscribers. The system process each additional query by transmitting one or more additional messages that are responsive to each additional query to the additional subscriber that submitted the additional query. As with the first queries of the first subscriber, for each additional query, the system may: (i) determine a processing time ($req\_t_i$) that the system took to respond to the additional query; (ii) receive, from the electronic devices of each additional subscriber for one or more of the additional messages, an additional acknowledgement of receipt; (iii) for each additional acknowledgement of receipt, determine an additional total time (time$_n$) representing a time from when the additional subscriber received an associated query to a time at which the data center received the acknowledgement; and (iv) also use the determined additional processing times and the determined additional total times when assessing the latency of the communication network.

In some embodiments, the system may categorize the subscribers and into multiple groups by geographic location. It may then identify the group of the multiple groups that is experiencing relatively higher latency than the other groups, and it may then determine that the geographic location of the identified group is a location of an indicated event.

In some embodiments, the system may categorize the subscribers into multiple groups by data centers based on connection sessions, identify the group of the multiple groups that is experiencing relatively higher latency than the other groups, and determine that the data center associated with the identified group is a source of latency.

In some embodiments, before assessing the latency, the system may identify any of the messages that experienced packet loss, and it may remove processing times and total times for the messages that experienced packet loss from consideration when assessing the latency.

A variety of additional aspects will be set forth in the description that follows. The aspects can relate to individual features and to combinations of features. It is to be understood that both the foregoing general description and the following detailed description are by way of example and explanatory only and are not restrictive of the broad inventive concepts upon which the embodiments disclosed in the present disclosure are based.

BRIEF DESCRIPTION OF THE FIGURES

FIG. 3 illustrates a sample data set for a connection session for a subscriber.

FIG. 4B illustrates a sample data set for multiple subscribers.

FIG. 4C illustrates another sample data set for multiple subscribers.

DETAILED DESCRIPTION

Figure 1:
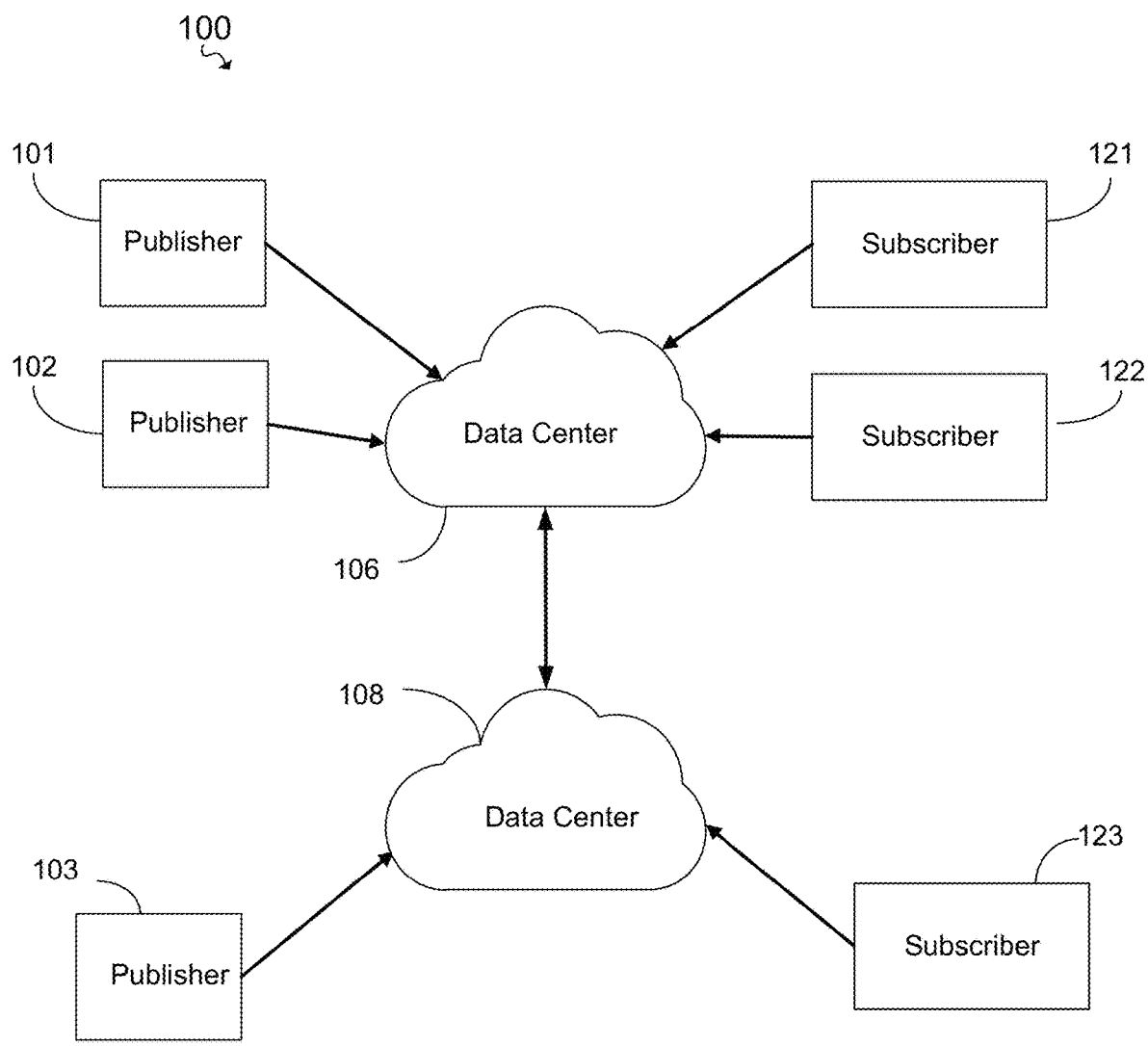
FIG. 1 illustrates an example system for sharing information among various subscribers and other users.

In the following detailed description, numerous details are set forth in order to provide an understanding of the embodiments described in the present disclosure. However, it will be understood by those skilled in the art that different and numerous embodiments may be practiced without those specific details, and the claims and disclosure should not be limited to the embodiments, subassemblies, features, processes, methods, aspects, features or details specifically described and shown in the present disclosure. Further, particular features described in the present disclosure can be used in combination with other described features in each of the various possible combinations and permutations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Moreover, the following detailed description omits or only briefly describes conventional features of the data processing environment configured to share information among various subscribers and other users, which are apparent to those skilled in the art. Unless otherwise specifically defined in the present disclosure, all terms are to be given their broadest possible interpretation including meanings implied from the specification as well as meanings understood by those skilled in the art and/or as defined in dictionaries, treatises, etc.

As used in the specification and the appended claims, the singular forms "a," "an" and "the" include plural referents unless otherwise specified. The terms "comprises" and/or "comprising," when used in this specification, specify the presence of stated features, steps, operations, elements, and/or components, but do not preclude the presence or addition of one or more other features, steps, operations, elements, components, and/or groups.

The terms "application object," "data object" and in some instances simply "object" refer to one or more discrete bundles of stored data that may be used by a software application to perform a function. Examples include JavaScript Object Notation (JSON) objects (which typically consists of one or more of attribute-value pairs) and ASP application objects.

The term "message" as used in this document means one or more discrete bundles of data containing content and/or instructions, routing information, and authentication information. In some embodiments, at least some messages published in the system described below will have a size that is less than or equal to 7.2 kilobytes. In some embodiments, the messages published in the system may have a median size of approximately 330 bytes. The content (i.e., payload) of a message may be part of the message, routing and authentication information may be included in another part such as a header, and the entire payload and header may be wrapped in an envelope. Messages can optionally be encrypted, e.g. through SSL and AES encryption protocols. Messages can be formatted in a standard data-format (e.g., JSON, XML, HTML, and the like).

The terms "cloud computing system," "cloud application service," "cloud platform service," "web service" and the like refer to one or more physical and/or logical computing devices that operate as a shared resource for multiple other computing devices. An example may include a server on which an application is run or data is streamed, connected via an Internet Protocol (IP) connection among several client computing devices. Examples of client devices may include computers equipped with a browser, smart phones, and other networked devices, operating systems, and browsers. The client devices may run a specific application to receive the data, or they may simply open a window or other connection, such as via a browser, through which the client can view operation of the application on the remote server. With a cloud computing system, it may be possible to share services and/or data between within any of the following layers: (i) client; (ii) application; (iii) platform; (iv) infrastructure; and/or (v) server. Cloud application services deliver software and/or data as a service over a network such as the Internet. For example, cloud platform services may deliver a computing platform and/or solution stack as a service.

A "computing device" or "electronic device" is a device that includes a processor and non-transitory computer-readable memory. The memory contains programming instructions in the form of a software application that, when executed by the processor, causes the device to perform various operations according to the programming instructions. Examples of computing devices or electronic devices may include computers, servers, smartphones, personal digital assistants, cameras, tablet devices, electronic readers, personal computers, media players, satellite navigation devices, TVs, automobiles, home appliances, and the like.

A "client" is an electronic device that a subscriber or other user may use to access a web service, or an application installed and running on an electronic device for such use.

The terms "memory" and "computer-readable medium" each refer to a non-transitory device on which computer-readable data, programming instructions or both are stored. Unless the context specifically states that a single device is required or that multiple devices are required, the terms "memory" and "computer-readable medium" include both the singular and plural embodiments, as well as portions of such devices such as memory sectors.

A "data center" is a memory device, a portion of such a device or a collection of such devices that is part of a cloud computing system.

A "processor" or "processing unit" is a component of an electronic device that executes programming instructions. The term "processor" may refer to either a single processor, or to multiple processors, that together implement various steps of a process. Unless the context specifically states that a single processor is required or that multiple processors are required, the term "processor" includes both the singular and plural embodiments.

The terms "customer" and "user" mean an entity that requests or accesses various data objects on a hosted service. The term "subscriber" means a user that registers with a portion of the service that provides published application objects so that the subscriber automatically receives published data objects from the service. The term "publisher" means an entity that publishes or otherwise processes messages that are to be published.

Embodiments disclosed in the present disclosure relates generally to distributing data over a network, and more particularly, to monitoring connectivity and detecting traffic patterns over the network. The embodiments are described below with reference to the Figures.

FIG. 1 depicts one or more embodiments of various components of a system 100, communicating on a network, to pass data among multiple client devices. For example, the system 100 may be configured to share information among publishers and subscribers over the network. The system 100 includes a data center 106, across which data is transferred via the network from a publisher, such as publishers 101 and 102, to one or more subscribers, such as subscribers 121 and 122. Data center 106 may replicate publishers' messages to any number of other geographically distributed data centers (such as data center 108) to reach other subscribers (such as subscriber 123) that are closer to the other data centers. Similarly, the first data center 106 may receive replicated messages from any other data center 108 to the extent that the other data center 108 received the messages from nearby publishers (such as publisher 103). The first data center may then transmit those messages to its proximate subscribers 121 and 122.

A publisher may be configured to publish messages to a data center 106 or 108. A subscriber may be configured to subscribe to a category of messages by subscribing to a channel monitored by the data centers 106, 108. The data centers 106, 108 may receive messages from clients who are publishers 101, 102, and 103, and may filter the messages to the respective channels. The data centers 106, 108 may automatically publish data updates to clients who are subscribers 121, 122, 123 to a data service. The publication may occur via one or more channels. A channel is a data source and/or data topic to which a client subscribes to receive published messages. For example, in the context of a distributed gaming system, a subscriber may subscribe to one or more player channels, including his/her own channel, or the channel(s) of other player(s). Then, when the data center 106 or 108 receives updated application objects and the updates correspond to the any of the subscriber's channels, the subscriber may receive updates to those objects so that the subscriber has the latest data corresponding to the subscriber's channels. Any number of subscribers may subscribe to a channel that publishes messages concerning the data source and/or data topic. In one or more cases, each data center may relay and/or receive data updates from other data centers to help quickly replicate data updates across the network as in a mesh communication system. Optionally, some or all data centers may transmit data to non-subscribing user clients upon request from the client.

The system 100 may operate using application objects, such as JSON objects that contain key/value pairs for various parameters. For example, an application object GameData/Players may contain data for various players in the context of a multiplayer game. Some of the values in the object for each player may remain static, such as the players name, avatar or location. Other values may change, such a score or state within the game. The system may enable other players to synchronize with the same application object so that one object may contain data for multiple players. Through the selection or assignment of channels, a particular user may be able to receive data only relating to specific players within the object, while not receiving data of other players who are not of interest to the particular user.

Each data center may automatically broadcast or otherwise publish data updates to subscribers and may have one or more of the same or similar features as the data center(s) as described in U.S. Pat. No. 9,965,640, issued May 8, 2018, titled "Real-Time Distribution of Messages via a Network with Multi-Region Replication in a Hosted Service Environment," and in U.S. Pat. No. 9,955,444, issued Apr. 24, 2018, titled "Data Synchronization Across Multiple Devices Connecting to Multiple Data Centers," the disclosures of which are incorporated into this document by reference in their entirety.

Figure 2:
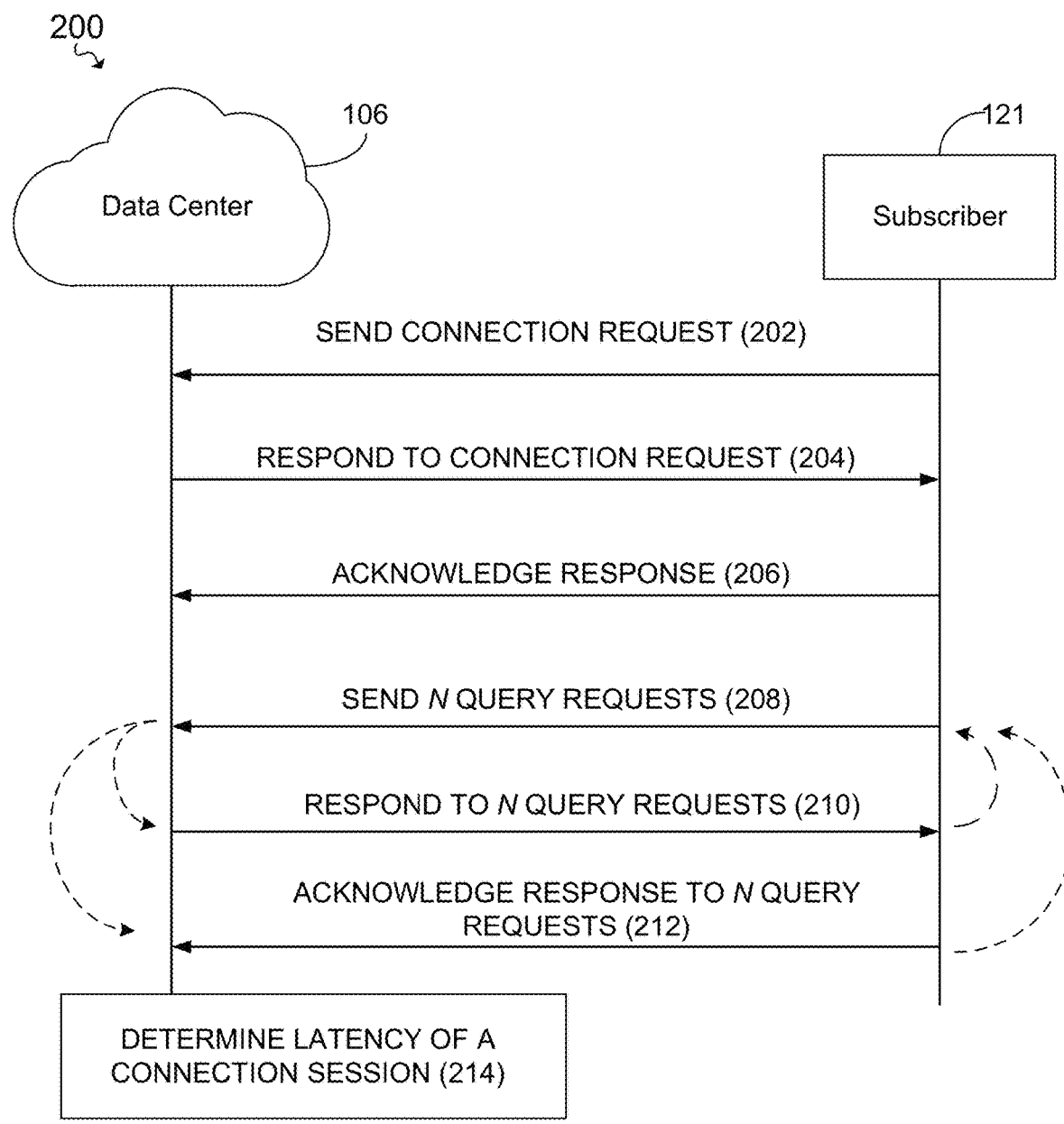
FIG. 2 is a flowchart illustrating a process for monitoring connectivity and detecting traffic patterns over a network.

FIG. 2 is a flowchart illustrating a process for monitoring connectivity and detecting traffic patterns over the network of FIG. 1. For example, the process may be used to monitor network connectivity of one or more client devices, such as subscriber 121, subscriber 122, and subscriber 123. FIG. 3 illustrates a sample data set for a connection session for the subscriber 121.

In one or more cases, for a subscriber 121 to receive messages relating to a data source and/or data topic, the subscriber 121 subscribes to a data channel by opening a long-lived connection session, via a protocol, to the nearest data center such as data center 106. The subscriber 121 may use the data channel to receive updates in real-time for events occurring asynchronous to the connection session. A protocol for opening a long-lived connection session may be for example, but not limited to, Transmission Control Protocol (TCP), long-polling, COMET, WebSockets, SPDY, Bidirectional-streams Over Synchronous HTTP (BOSH), Server-Sent Events (SSE), MQ Telemetry Transport (MQTT), gRPC, or Extensible Messaging and Presence Protocol (XMPP). It is noted that the example described in the present disclosure utilizes TCP for creating long-lived connection sessions between multiple subscribers, such as subscribers 121, 122, and 123, and the respective data centers, such as data center 106 and 108. By including a larger population of subscribers within a region, more connection data points may be analyzed to determine a correlation for network level events and/or whether an intrusion or disruption event is isolated to a specific connection.

To subscribe to a data channel, the subscriber 121 may open a TCP connection by sending a connection request (202) to a server of the data center 106. The connection request may be a synchronization packet that sets a sequence number to be used for a data transfer. The connection request includes the IP address and a port number that will be used by the subscriber 121, or some other identifier for the subscriber 121. The http path for the connection request may include the data channel. The server of the data center 106 may accept the connection request and respond to the connection request (204). The server may respond to the connection request by sending a synchronization-acknowledgement packet to the subscriber 121 that verifies the sequence number to be used and that acknowledges the subscriber's connection request. Having received the response from the server, the subscriber 121 may acknowledge the response (206). The subscriber 121 may acknowledge the server's response by sending an acknowledgement packet to the server that acknowledges the sequence number to be used. Having sent the acknowledgement packet, the TCP connection is established between the subscriber 121 and the data center 106. This tight subscribe loop between the data center and subscriber can help provide meaningful results, as it does not require participation by the publisher to assess latency.

In one or more cases, the data center 106 may monitor network latency as follows. Over a period of time, a number of subscribers will have established connection sessions, the subscribers (represented in FIG. 2 by individual subscriber 121, but in practice a group of subscribers) may send any number of (N) query requests (208) to the data center 106. Each query request may include an IP address, and/or one or more credentials of the subscriber that sent the request. The data center 106 may determine a time when the data center 106 receives a query request, and may log the received time for the query request in a table or other data structure. The data center 106 may mark a time-received for each query request, in which the time-received indicates a start time for measuring a time period (req_$t_i$). The time-received may be a timestamp of the first-byte received. The timestamp may be the timestamp since a determined time, such as 1970.

In one or more cases, the data center 106 may respond to each of the received N query requests (210). To respond to a query request, the data center 106 may process the query request by preparing a response to the query request. For example, using a process as described in U.S. Pat. No. 9,965,640, the data center may validate the requesting subscriber's credential, and examine a time token that is included with the request. The time token will represent a publication time of message that the subscriber previously received. The data center may then determine whether it has any messages that are due to (but not yet received by) the subscriber by determining whether it has any messages in the channel that have time tokens that are later than the subscriber's time token. The data center may then send those messages to the subscriber.

The data center 106 may determine a time period (req_$t_i$) for processing the query request, and may log the processing time (req_$t_i$) for each query request as shown in FIG. 3. The time period (req_$t_i$) may begin at the timestamp of the first byte received for a query request and end at the time to process the query request.

Each subscriber may receive the response to the query request, and at least some subscribers may acknowledge the response to the query request (212). In one or more cases, a subscriber may acknowledge the response by sending an ACK response message to the data center. The ACK response information includes the connected devices current queue location by sending an integer to the client device with a seventeen digit (or other sized) time token. During the delivery of the ACK response, the system records additional information including processing time (req_$t_i$), the time token and TCP session data associated with the connected device. This information is then logged and stored for processing the serial array of events in aggregate over the time series. The following is an example of the time token ACK (with spaces added to help illustrate elements of the token):

$$|-\text{seconds}-|-\text{ms}-|-\mu s-|-\text{ns}-|$$
$$[15690267287\ 974\ 857]$$

When the data center 106 receives an acknowledgement message from a subscriber, the data center 106 determines a received time for the acknowledgement message, and may log the received time in the table or other data structure. The data center 106 may calculate the total time (time$_n$) that may include the time from when the data center received the query request to the time from when the data center 106 received the acknowledgement message. The data center 106 may log total time (time$_n$) for each query request as shown in FIG. 3.

In one or more cases, the data center 106 may determine the latency of the connection session (214). In one or more cases, the latency may be the latency for a wide area network (WAN), and may represent the connectivity speed of the network between the subscriber and the data center. To determine the latency of the connection session, the data center 106 may determine the total time (time$_n$) and the time period (req_$t_i$) for at least two query requests. It is noted that the data center 106 may determine the total time (time$_n$) and the time period (req_$t_i$) for more than two query requests in order to generate a number of samples to analyze the latency of the network for the connection session. Having determined the total time (time$_n$) and the time period (req_$t_i$) for at least two query requests, the data center 106 may input the total time (time$_n$) and the time period (req_$t_i$) for each query request in the sample set into the following latency function:

$$\frac{\text{time}_n - \text{time}_1 - \left(\sum_{i=1}^{n} \text{req\_t}_i\right) - \text{req\_t}_1}{n-1}$$

where time and req_$t_i$ represent the total time to receive the first query request and the acknowledgement message for the response to the first query request, and the time period to process the first query request, respectively. The data center 106 may subtract the time to process the query request (req_$t_i$) from the total time (time$_n$) that includes receiving the query request and receiving an acknowledgement from the response to the query request. The data center 106 may perform the above function for the query requests in the connection session between any subscriber and the data center 106, as shown in FIG. 3, and determine the latency for each query request. In one or more cases, the data center 106 may average the determined latency for each query request to determine an average latency for the connection session.

In one or more cases, the data center 106 may analyze the determined latency of each query request in the sample set to determine whether the data has been compromised via a cyber-attack, such as a man-in-the-middle (MITM) attack. For example, during a MITM attack, the attacker may intercept packets of a message sent to a client device, such as the subscriber 121, and may rewrite the packets to alter the packets of the message. By intercepting and rewriting the packets, the latency of the query request transaction would increase dramatically compared to the latency of the other request transactions. The data center 106 may determine that the dramatic latency increase of the query request transaction may indication that the message has been compromised, for example, by a MITM attack.

In one or more cases, the data center 106 may collect information on additional connection sessions between additional subscribers to determine an average, mean, or another aggregated measure of latency for a particular connection session. For example, the data center 106 may analyze the average latency for the TCP connection between the data center 106 and the subscriber 122, and for the TCP connection between the data center 106 and the subscriber 123. That is, the data center 106 may determine the latency across multiple connection sessions for multiple subscribers. The data center 106 may aggregate the determined latency for the multiple connection sessions to detect traffic patterns over the network. The data center 106 may also receive the latency information from connection sessions between subscribers connected to other data centers.

The data center 106 may compile the latency information for individual subscribers and/or the aggregated latency information for multiple subscribers in a communication session to determine various categories of trends. In one or more cases, the data center 106 may categorize the subscribers by geographic location, such as by grouping subscribers having IP addresses that represent a particular geographic area, or whose GPS coordinates indicate that they are in a particular geographic area The system may then compare the latencies of messages for each subscriber category to determine which group is experiencing a relatively higher latency than the other groups. This can help the system determine traffic patterns over one or more geographic locations. In one or more cases, the data center 106 can detect an anomaly within a geographic location in real-time.

Figure 4A:
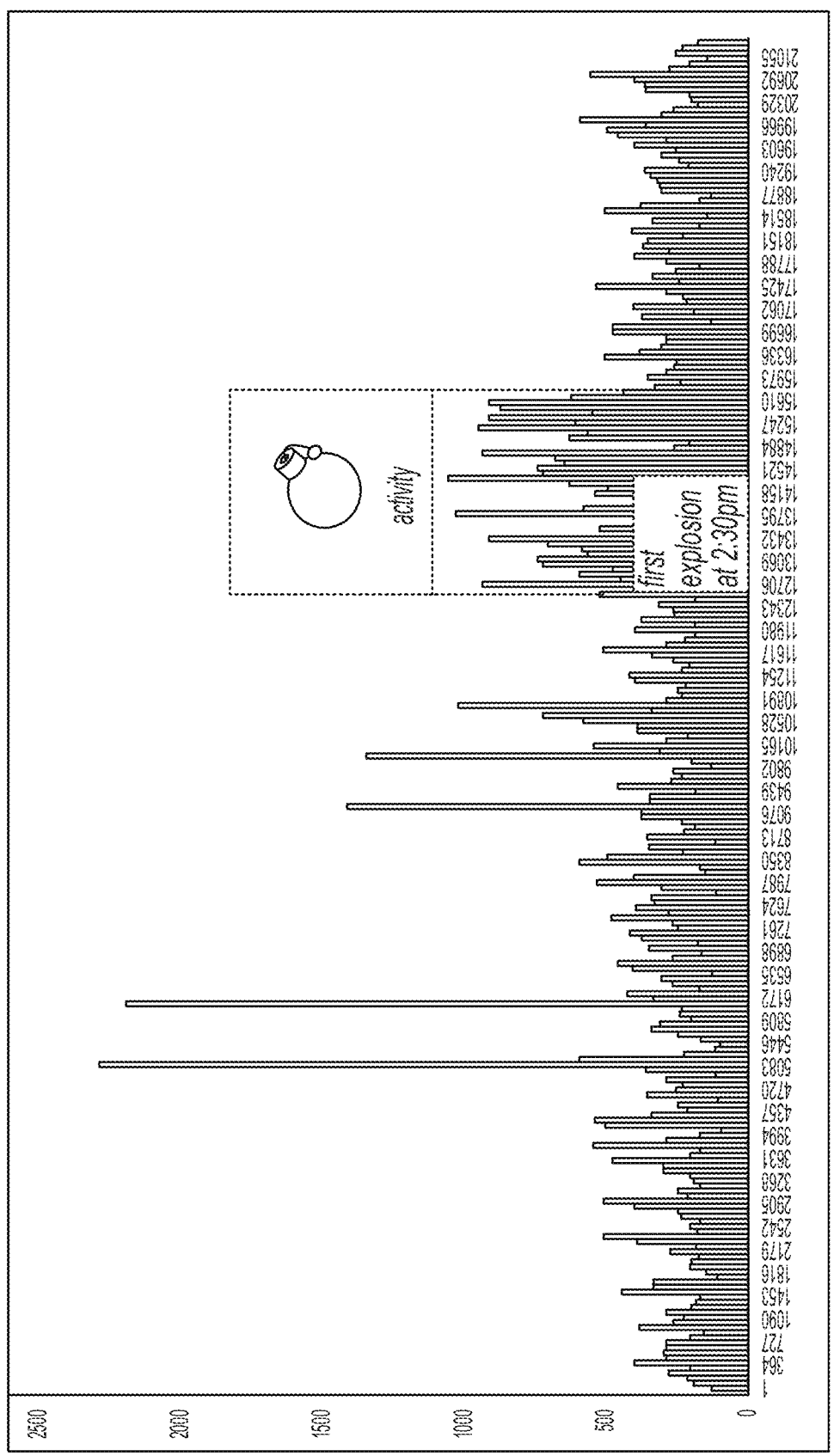
FIG. 4A illustrates a sample data set for multiple subscribers within a geographic location.

By analyzing the internet connectivity of a group of devices in this way, traffic patterns may be used to indicate the likely or actual occurrence of significant events for example, but not limited to social, political, natural, and/or cyber disasters, that effects a large portion of people. For example, the data center 106 may group the subscribers via a geographic location. As shown in FIG. 4A, if an event such as a bomb threat or attack occurs at the location at a given time (e.g., 2:30 pm) internet usage for numerous devices are likely to increase dramatically at the geographic location. Accordingly, the latency for communicating with the devices within this geographic location also will increase. In one or more other cases, the data center 106 may categorize the subscribers based on their connection sessions to a specific data center, such as a west data center, as shown in FIG. 4B, and an cast data center, as shown in FIG. 4C. As shown in FIG. 4B, the latency of the connection sessions for the subscribers connected to the west data center is greater than the latency of the connection sessions for the subscribers connected to the cast data center. Accordingly, the data center 106 may determine that the subscribers connected to the west data center may have internet connection issues.

Figure 4D:
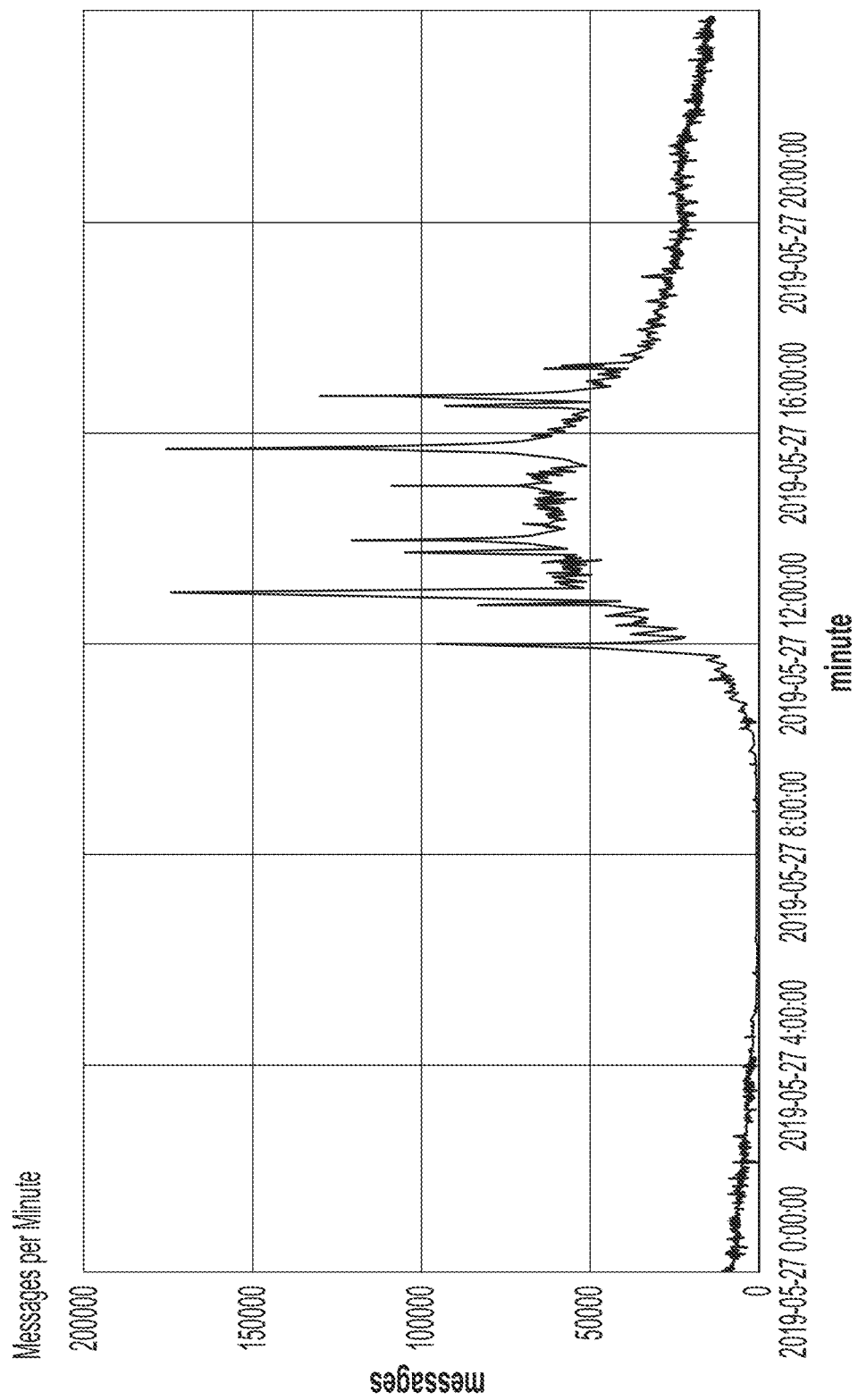
FIG. 4D illustrates another sample data set for multiple subscribers.

In one or more cases, the data center 106 may organize the messages by a time period, for example, but not limited to, a day, week, or month, in order to determine peak times when internet usage increases. For example, FIG. 4D illustrates that a most active time in a day at a gym may be from 12:00 μm to 5:00 μm. In addition to or in one or more other cases, the data center 106 may organize the messages based on other factors, including but not limited to, internet service providers, age, gender, user identifiers, birthdays, or types of exercises for cases in which the device is a type of exercise machine.

In one or more cases, the data center 106 may distinguish packet loss from latency. To determine packet loss, the data center 106 may precondition the latency function to create a packet loss data set. For example, for any message for which the data center does not receive an acknowledgement of receipt from the subscriber within a threshold period of time, the system may determine that packets were not delivered at all. The data center 106 may compare the size of the packet loss data set to the size of the latency data set to determine the of the latency that is actually packet loss rather than a mere time delay lag in delivery of messages. Optionally, the system may remove messages that experienced packet loss from consideration in the calculation of latency.

If the system detects unacceptable latency in a network's delivery of messages to a subscriber, it may change the route by which it will direct messages to that subscriber in order to find a route with less latency. A determination of unacceptable latency may be made if the average latency of messages to the subscriber exceeds a threshold value over a period of time, or if the total percentage of messages delivered to the subscriber exceeds a latency threshold, or by some other criteria. The system also may compare the assessed latency for an individual subscriber to the aggregated latency for other subscribers and determine that the assessed latency is unacceptable if the assessed latency exceeds the aggregated latency by a threshold amount.

To change the route, the system may have access to multiple possible routes, and it may select an alternate route from the possible routes using any suitable criteria, such as by selecting the next route in an ordered list, selecting the route having the lowest current latency, by a shortest path analysis, randomly, or by any other suitable method. Alternatively, in some systems where the messages are replicated to multiple data centers, the alternate route may include selecting a change of data center to a data center that is not the one from which the unacceptable latency is occurring. The alternate data center may be a data center that is most proximate to the subscriber (so long as that data center is not the one that is experiencing the latency, in which case the next most proximate data center may be selected). The system may determine data center proximity to the subscriber using any suitable method, such as by: (a) receiving global positioning system (GPS) coordinates from the subscriber and comparing the GPS coordinates to known data center locations to find the data center that is closes to the coordinates; or (b) by receiving a network identifier from the subscriber, determining a location of the network that is associated with the identifier, and comparing the location with known data center locations to find the data center that is closes to the location.

In some embodiments, the system may make the change to an alternate route automatically, without requiring any user response or other action. In other embodiments, the system may present the change to a user of the electronic device as an option, such as a message output via a user interface of the electronic device asking the user to accept or reject a change to of route. Optionally, the system may present multiple candidate routes to the user and permit the user to choose the alternate route. In such situations, the system may receive a user indication of acceptance or alternate route selection as an input to via a user interface of the device. In addition, the system include a default selection and consider that if the user does not respond to the prompt within a timeout period, it will consider the non-response as indication of acceptance, and in response it will change to the alternate route.

Figure 5:
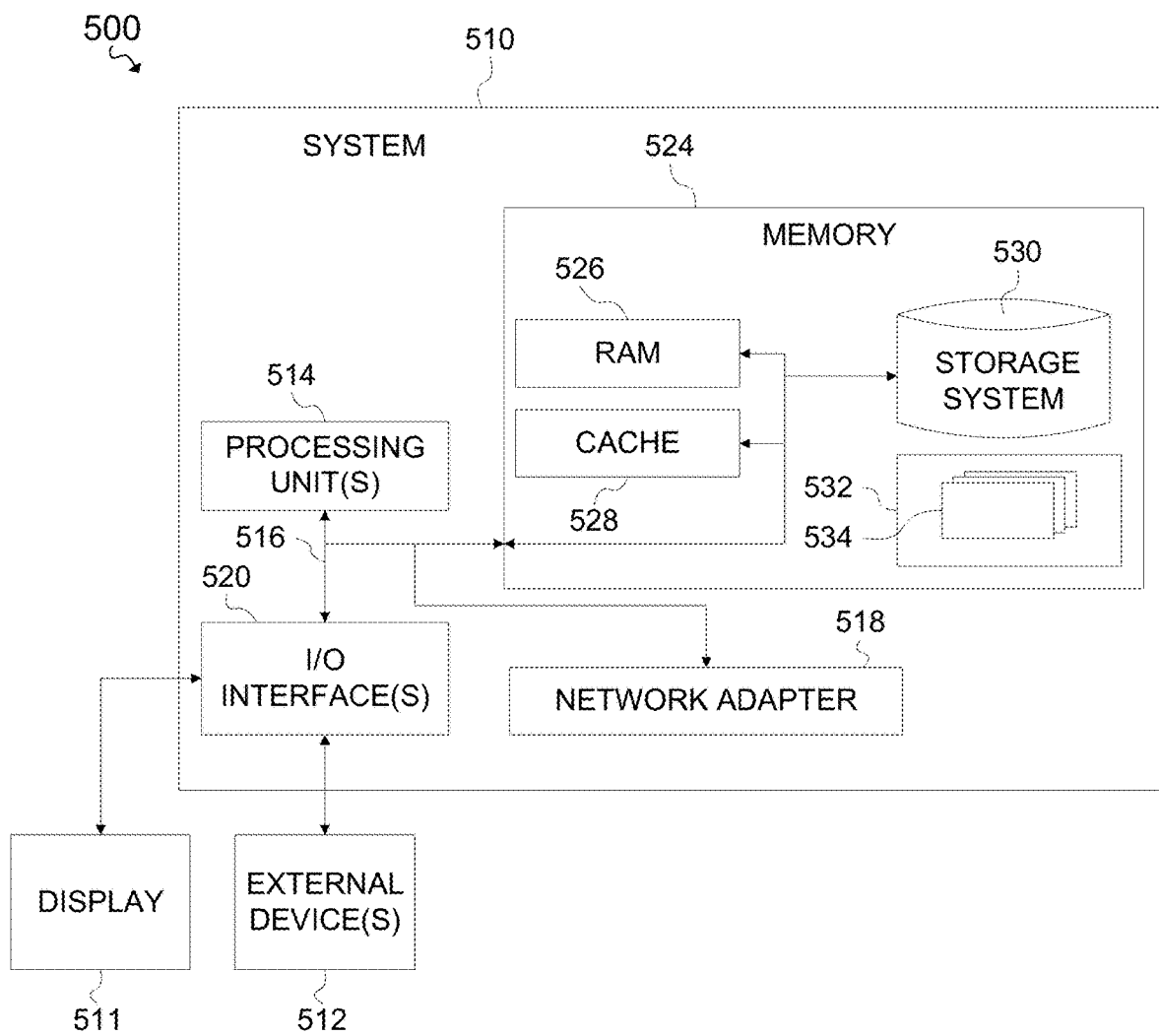
FIG. 5 is a block diagram depicting components of a data processing system.

FIG. 5 is a block diagram depicting various hardware components that may be part of a web service provider's electronic device or any client electronic device. For example, any of the devices shown in FIG. 1 may include similar internal hardware architecture such as that illustrated in FIG. 5. FIG. 5 provides only an illustration of one implementation and does not imply any limitations with regard to the environments in different embodiments that may be implemented. Many modifications to the depicted environment may be made.

In one or more cases, the devices in FIG. 1 are shown in the form of computing electronic devices, such as computer system 510. The components of the computer system 510 may include, but are not limited to, one or more processors or processing unit 514, a memory 524, and a bus 516 that couples various system components including the memory 524 to the processing unit 514.

The bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system 510 typically includes a variety of computer system readable media. Such media may be any available media that is accessible by the computer system 510, and it includes both volatile and non-volatile media, removable and non-removable media.

The memory 524 can include computer system readable media in the form of volatile memory, such as random access memory (RAM) 526 and/or cache memory 528. The computer system 510 may further include other removable/non-removable, volatile/non-volatile computer system storage media. By way of example only, the storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to the bus 516 by one or more data media interfaces. As will be further depicted and described below, the memory 524 may include at least one computer program product having a set (e.g., at least one) of program modules that are configured to carry out the functions of embodiments.

A program/utility 532, having one or more sets of program modules (i.e., programming instructions) 534, may be stored in the memory 524 by way of example, and not limitation, as well as an operating system, one or more application programs, other program modules, and program data. Each of the operating systems, one or more application programs, other program modules, and program data, or some combination thereof, may include an implementation of a networking environment. The program modules 534 generally carry out the functions and/or methodologies of embodiments as described in this document. The computer system 510 may also communicate with one or more external device(s) 512 such as a keyboard, a pointing device, a display 511, etc., or one or more devices that enable a user to interact with the computer system 510 and any devices (e.g., network card, modem, etc.) that enable the computer system 510 to communicate with one or more other computing devices. Such communication can occur via Input/Output (I/O) interface(s) 520. Still yet, the computer system 510 can communicate with one or more networks such as a local area network (LAN), a general wide area network (WAN), a cellular telephone data network, and/or a public network (e.g., the Internet) via a network adapter 518. As depicted, the network adapter 518 communicates with the other components of the computer system 510 via the bus 516. It should be understood that although not shown, other hardware and software components, such as microcode, device drivers, redundant processing units, external disk drive arrays, RAID systems, tape drives, and data archival storage systems may be used in conjunction with the computer system 510.

The embodiments described in the present disclosure may relate to a system, a method, and/or a computer program product. The computer program product may include a computer readable storage medium (or media) having computer readable program instructions for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions, cloud storage, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this document can be downloaded to respective computing/processing devices from a non-transitory computer readable storage medium or to an external computer or external storage device via a network, for example, the Internet, a local area network, a wide area network, a cellular telephone data network, and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the embodiments may be instruction-set-architecture (ISA) instructions, machine instructions, machine dependent instructions, microcode, firmware instructions, state-setting data, or either source code or object code written in any combination of one or more programming languages, including an object oriented programming language such as C++ and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be communicatively connected to the user's computer through any type of network, including a local area network (LAN) or a wide area network (WAN), or the connection may be made to an external computer (for example, through the Internet using an Internet Service Provider). In one or more cases, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments described in the present disclosure.

Aspects of the embodiments are described in this document with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by non-transitory computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other devices to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may be executed substantially concurrently, the blocks may sometimes be executed in the reverse order, depending upon the functionality involved, or the blocks may sometimes be executed out of order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

The various embodiments described above are provided by way of illustration only and should not be construed to limit the claims presented below. It will be appreciated that one or more embodiments of the above-disclosed and other features and functions, or alternatives thereof, may be desirably combined into many other different systems or applications.

The invention claimed is:

1. A method of detecting latency in a communication network, the method comprising, by a processor of a system comprising first data center:
establishing a connection session with an electronic device of a first subscriber;
receiving a plurality of queries from the electronic device of the first subscriber during the connection session;
in response to each query, transmitting one or more messages from the first data center to the electronic device of the first subscriber via a communication network;
for each query:
determining a processing time ($req\_t_i$) that the first data center took to respond to the query, and
receiving, from the electronic device of the first subscriber for one or more of the transmitted messages, an acknowledgement of receipt;
for each acknowledgement of receipt, determining a total time ($time_n$) for the query associated with the acknowledgement of receipt representing a time from when the first data center received the associated query to a time at which the first data center received the acknowledgement of receipt;
for each query, determining a latency for the query as a difference between the total time ($time_n$) and the processing time ($req\_t_i$) of the query;

determining a latency for the connection session; and
upon detecting that the latency determined for the connection session exceeds a threshold, selecting, from a group of geographically distributed data centers, an alternate data center to transmit future messages to the first subscriber.

2. The method of claim 1, wherein determining the latency for the connection session comprises determining an average of the latencies for each of the queries.

3. The method of claim 1, wherein determining the latency for the connection session comprises determining that the values of the latencies have increased during the connection session.

4. The method of claim 1 further comprising, by the processor:
receiving a plurality of additional queries from a plurality of additional subscriber electronic devices;
in response to each of the additional queries, transmitting an additional one or more messages to each additional subscriber electronic device from the first data center via the communication network;
for each additional query from each additional subscriber:
determining a processing time ($req\_t_i$) that the first data center took to respond to the additional query, and
receiving, from the additional subscriber electronic device that submitted the query, an acknowledgement of receipt; and
for each acknowledgement of receipt from each additional subscriber, determining a total time ($time_n$) for the additional query associated with the additional acknowledgement of receipt representing a time from when the first data center received the associated additional query to a time at which the first data center received the additional acknowledgement of receipt,
wherein determining the latency for the connection session comprises:
assessing an aggregated latency of the communication network as a function of the determined processing times ($req\_t_i$) and the determined total times ($time_n$) for the queries from the additional subscribers, and
comparing the aggregated latency of the communication network with an assessed latency of the communication network for the first subscriber.

5. The method of claim 1, wherein selecting the alternate data center comprises selecting, from the plurality of geographically distributed data centers, a data center that is most proximate to the first subscriber.

6. The method of claim 1, further comprising:
presenting the alternate data center to the first subscriber via the electronic device; and
in response to receiving an indication of acceptance from the first subscriber via the electronic device, using the alternate data center to transmit one or more of the future messages to the first subscriber.

7. The method of claim 1, wherein:
establishing the connection session with the electronic device of a first subscriber comprises establishing a TCP connection between the first data center and the electronic device of the first subscriber; and
the method further comprises:
when transmitting the one or more messages that are responsive to each query, doing so via the TCP connection, and
after assessing the latency, upon detecting that the latency exceeds a threshold, closing the TCP connection and establishing a new TCP connection between the first data center or the alternate data center and the electronic device of the first subscriber.

8. The method of claim 1 further comprising, by the processor:
receiving a plurality of additional queries from electronic devices of additional subscribers;
processing each additional query by transmitting one or more additional messages that are responsive to each additional query from the first data center to the additional subscriber that submitted the additional query;
for each additional query, determining a processing time ($req\_t_i$) that the first data center took to respond to the additional query;
receiving, from the electronic devices of each additional subscriber for one or more of the additional messages, an additional acknowledgement of receipt;
for each additional acknowledgement of receipt, determining an additional total time ($time_n$) representing a time from when the system received an associated query from the additional subscriber to a time at which the first data center received the acknowledgement; and
also using the determined additional processing times and the determined additional total times when assessing the latency for the connection session.

9. The method of claim 8, further comprising:
categorizing the first subscriber and the additional subscribers into multiple groups by geographic location;
identifying the group of the multiple groups that is experiencing relatively higher latency than the other groups; and
determining a geographic location of the identified group as a location of an indicated event.

10. The method of claim 8, further comprising:
categorizing the first subscriber and the additional subscribers into multiple groups by data centers based on connection sessions;
identifying the group of the multiple groups that is experiencing relatively higher latency than the other groups; and
determining that the data center associated with the identified group is a source of latency.

11. The method of claim 1, further comprising:
before assessing the latency, identifying any of the messages that experienced packet loss; and
removing processing times and total times for the messages that experienced packet loss from consideration when assessing the latency.

12. A communication system, comprising:
a processor; and
a computer readable storage medium containing programming instructions that are configured to cause the processor to:
establish a connection session with an electronic device of a first subscriber,
in response to receiving a plurality of queries from the electronic device of the first subscriber during the connection session, transmit one or more messages from the first data center to the electronic device of the first subscriber via a communication network;
for each query, determine a processing time ($req\_t_i$) that the first data center took to respond to the query;
for each of a plurality of acknowledgements of receipt received from the electronic device of the first subscriber for one or more of the transmitted messages, determine a total time ($time_n$) for the query associated with the acknowledgement of receipt representing a time from when the first data center received the associated query to a time at which the first data center received the acknowledgement of receipt;

for each query, determine a latency for the query as a difference between the total time (time$_n$) and the processing time (req_t$_i$) of the query;

determine a latency for the connection session; and upon detecting that the latency determined for the connection session exceeds a threshold, select, from a group of geographically distributed data centers, an alternate data center to transmit future messages to the first subscriber.

13. The system of claim 12, wherein the instructions to determine the latency for the connection session comprise instructions to:

determine an average of the latencies for each of the queries; or determine whether the values of the latencies have increased during the connection session.

14. The system of claim 13, further comprising instructions to:

before assessing the latency, identify any of the messages that experienced packet loss; and remove processing times and total times for the messages that experienced packet loss from consideration when assessing the latency.

15. The system of claim 12, further comprising instructions to:

in response to receiving a plurality of additional queries from a plurality of additional subscriber electronic devices, transmit an additional one or more messages to each additional subscriber electronic device from the first data center via the communication network;

for each additional query from each additional subscriber:
determine a processing time (req_t$_i$) that the first data center took to respond to the additional query, and for any acknowledgement of receipt received, from the additional subscriber electronic device that submitted the query, determine a total time (time$_n$) for the additional query associated with the additional acknowledgement of receipt representing a time from when the first data center received the associated additional query to a time at which the first data center received the additional acknowledgement of receipt, wherein the instructions to determine the latency for the connection session comprise instructions to:

assess an aggregated latency of the communication network as a function of the determined processing times (req_t$_i$) and the determined total times (time$_n$) for the queries from the additional subscribers, and compare the aggregated latency of the communication network with an assessed latency of the communication network for the first subscriber.

16. The system of claim 12, further comprising instructions to:

present the alternate data center to the first subscriber via the electronic device; and in response to receiving an indication of acceptance from the first subscriber via the electronic device, use the alternate data center to transmit one or more of the future messages to the first subscriber.

17. The system of claim 12, wherein:

the instructions to establish the connection session with the electronic device of a first subscriber comprises instructions to establish a TCP connection between the first data center and the electronic device of the first subscriber; and the instructions further comprise instructions to:

when transmitting the one or more messages that are responsive to each query, doing so via the TCP connection, and after assessing the latency, upon detecting that the latency exceeds a threshold, close the TCP connection and establish a new TCP connection between the first data center or the alternate data center and the electronic device of the first subscriber.

18. The system of claim 12 further comprising instructions to, in response to receiving a plurality of additional queries from electronic devices of additional subscribers;

process each additional query by transmitting one or more additional messages that are responsive to each additional query from the first data center to the additional subscriber that submitted the additional query;

for each additional query, determine a processing time (req_t$_i$) that the first data center took to respond to the additional query;

in response to receiving, from the electronic devices of each additional subscriber for one or more of the additional messages, an additional acknowledgement of receipt determine an additional total time (time$_n$) representing a time from when the system received an associated query from the additional subscriber to a time at which the first data center received the acknowledgement; and also use the determined additional processing times and the determined additional total times when assessing the latency for the connection session.

19. The system of claim 18, further comprising instructions to:

categorize the first subscriber and the additional subscribers into multiple groups by geographic location;

identify the group of the multiple groups that is experiencing relatively higher latency than the other groups; and determine a geographic location of the identified group as a location of an indicated event.

20. The system of claim 18, further comprising instructions to:

categorize the first subscriber and the additional subscribers into multiple groups by data centers based on connection sessions;

identify the group of the multiple groups that is experiencing relatively higher latency than the other groups; and determine that the data center associated with the identified group is a source of latency.

* * * * *